United States Patent [19]
Scheiwiller

[11] Patent Number: 5,348,417
[45] Date of Patent: Sep. 20, 1994

[54] COMPOUND PAVEMENT STONE

[75] Inventor: René Scheiwiller, Hergiswil, Switzerland

[73] Assignee: Rolf Scheiwiller, Hergiswil, Switzerland; a part interest

[21] Appl. No.: 982,852

[22] Filed: Nov. 30, 1992

[51] Int. Cl.⁵ .............................................. E01C 5/00
[52] U.S. Cl. ...................................... 404/41; 404/38; 404/42
[58] Field of Search ................. 404/29, 34, 40–42; 52/596–604, 608

[56] References Cited

U.S. PATENT DOCUMENTS

| | | | |
|---|---|---|---|
| 3,931,700 | 1/1976 | Scanni et al. | 404/41 X |
| 3,947,192 | 3/1976 | Rosenberger | 404/41 |
| 4,125,341 | 11/1978 | Reinschutz | 404/41 |
| 4,761,095 | 8/1988 | Bartlechner | 404/41 |
| 4,834,575 | 5/1989 | Barth et al. | 404/41 X |
| 4,973,192 | 11/1990 | Hair | 404/34 |
| 5,028,167 | 7/1991 | Scheiwiller | 404/41 |
| 5,046,887 | 9/1991 | Fontana et al. | 404/34 |
| 5,052,158 | 10/1991 | D'Luzansky | 404/41 X |
| 5,054,957 | 10/1991 | Johnson, II | 404/41 |
| 5,133,620 | 7/1992 | Scheiwiller | |

FOREIGN PATENT DOCUMENTS

| | | | |
|---|---|---|---|
| 0227144 | 1/1987 | European Pat. Off. | 404/34 |
| 2543287 | 4/1977 | Fed. Rep. of Germany . | |
| 2609301 | 4/1977 | Fed. Rep. of Germany . | |
| 2610735 | 9/1977 | Fed. Rep. of Germany . | |

Primary Examiner—Kenneth J. Dorner
Assistant Examiner—Nancy Mulcare
Attorney, Agent, or Firm—Richard Linn

[57] ABSTRACT

The side surfaces of compound stones are provided with relatively flat elements which interlock with little play when said stones are laid out, while adjoining side surfaces of neighboring stones are in contact along two lines only. A compromise between a sufficient mutual securement of the stones and a certain mutual mobility thereof is thus obtained. In particular, a certain tilting of neighboring stones with respect to each other is possible, whereby it is possible to produce pavements in uneven places.

13 Claims, 2 Drawing Sheets

COMPOUND PAVEMENT STONE

BACKGROUND OF THE INVENTION

The present invention refers to a compound pavement stone having complementally shaped elements on side surfaces of the stone. Different embodiments of such composite stones are known, said elements generally being formed in such a manner that they interlock substantially without any clearance when the pavement is laid out in order to prevent any mutual displacement of said stones. Also, in this case, the joints between neighboring stones are so narrow that they do not have to be filled up with sand. On the other hand, compound stones are known which have elements which interlock without any play but whose surfaces are at a certain distance from each other when the compound pavement is laid out. Likewise, a mutual displacement of the stones is substantially excluded, but they have to be filled up with sand.

SUMMARY OF THE INVENTION

It is an object of the present invention to provide a compound pavement stone having complemental elements, the stone representing a compromise in so far as a mutual displacement of the stones is substantially prevented and filling up spaces with sand is unnecessary while also making possible a certain mutual mobility of the stones, in particular a slight mutual tilting. This object is attained by the use of a compound pavement stone having complementally shaped elements wherein the elements interlock with a clearance and thereby allow a mutual tilting of neighboring stones. According to another embodiment, the complemental elements interlock with little clearance or are in line contact with each other. Particular embodiments are defined in the dependent claims.

SHORT DESCRIPTION OF THE DRAWINGS

The invention is described in more detail hereinafter with reference to an example of an embodiment which is illustrated in the drawing.

FIG. 1 shows a spatial representation of a stone;
FIG. 2 shows a section of a pavement; and
FIG. 3 shows a side view of a part of the pavement.

DETAILED DESCRIPTION OF THE INVENTION

Figure 1:
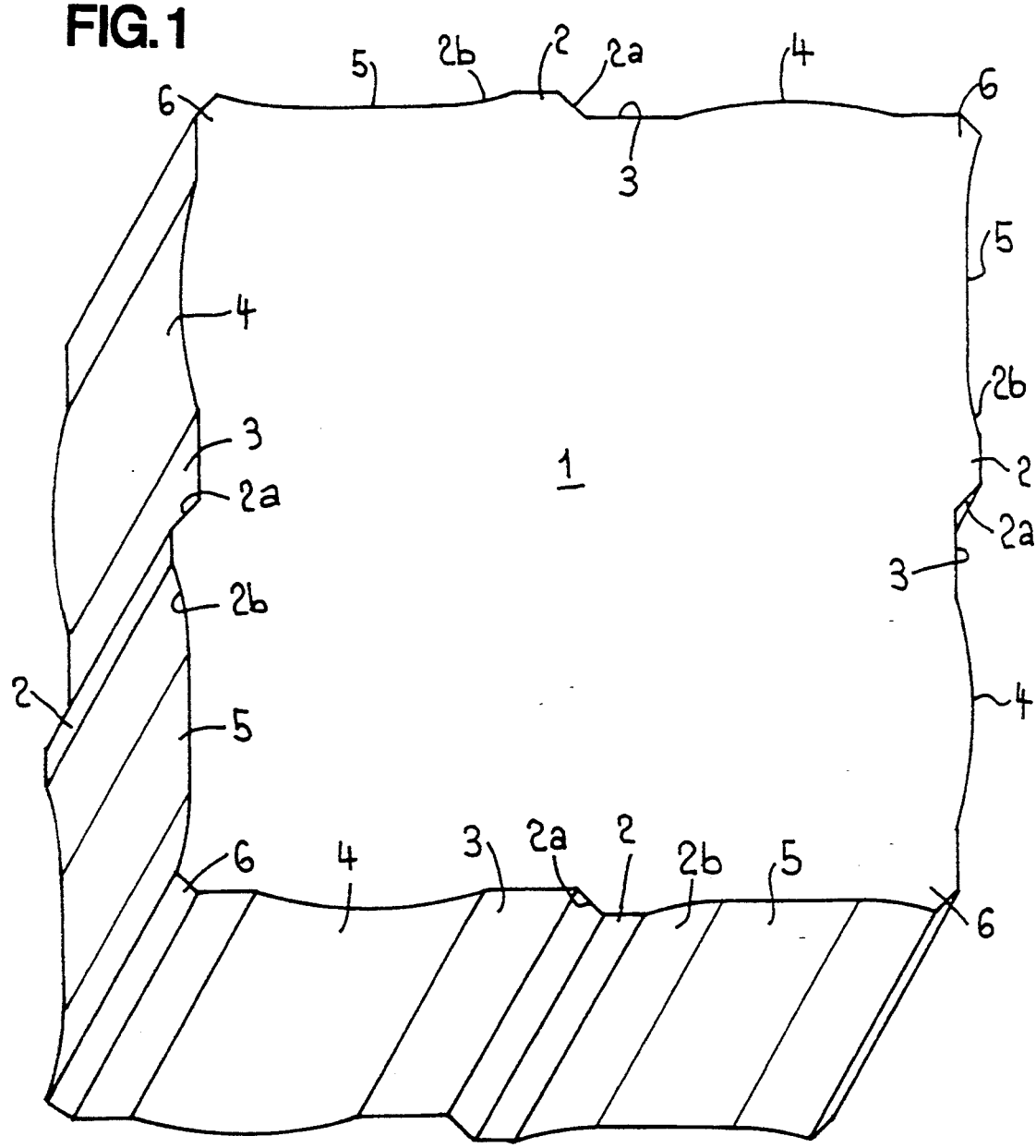

Compound stone 1 shown in FIG. 1 has an essentially square shape with four equally formed lateral surfaces having cyclically recurrent elements and surface portions, respectively. Each lateral surface is provided with a locking tooth 2 having a relatively steep flank 2a on one side and a less steep flank 2b on the other sides. The steep flank 2a of the locking tooth 2 is followed by a tooth space 3 having a flat planar bottom. Adjacent said tooth space 3, there is a convex surface portion 4 whose profile has a regular curvature or circular shape. The flat flank 2b of tooth 2 is followed by a concave surface portion having slightly vaulted sides and a flat central portion 5. The corners of the stone are in the form of teeth 6 having relatively weakly inclined flanks on either side. As mentioned, parts 2 to 5 recur on all four sides of the stone in a cyclic manner.

Figure 3:
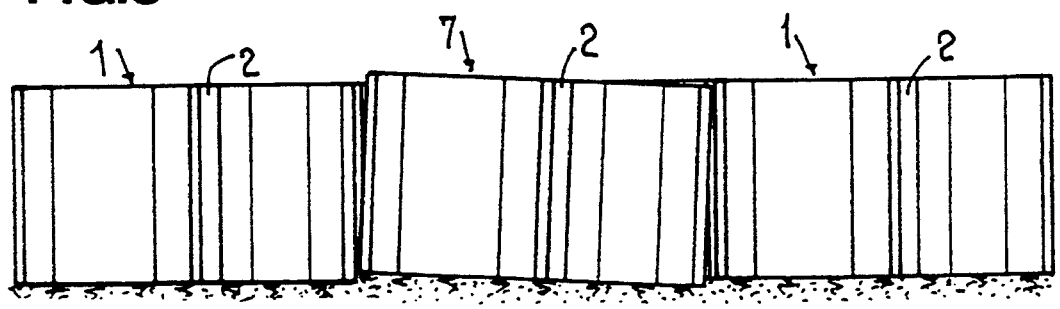
Figure 2:
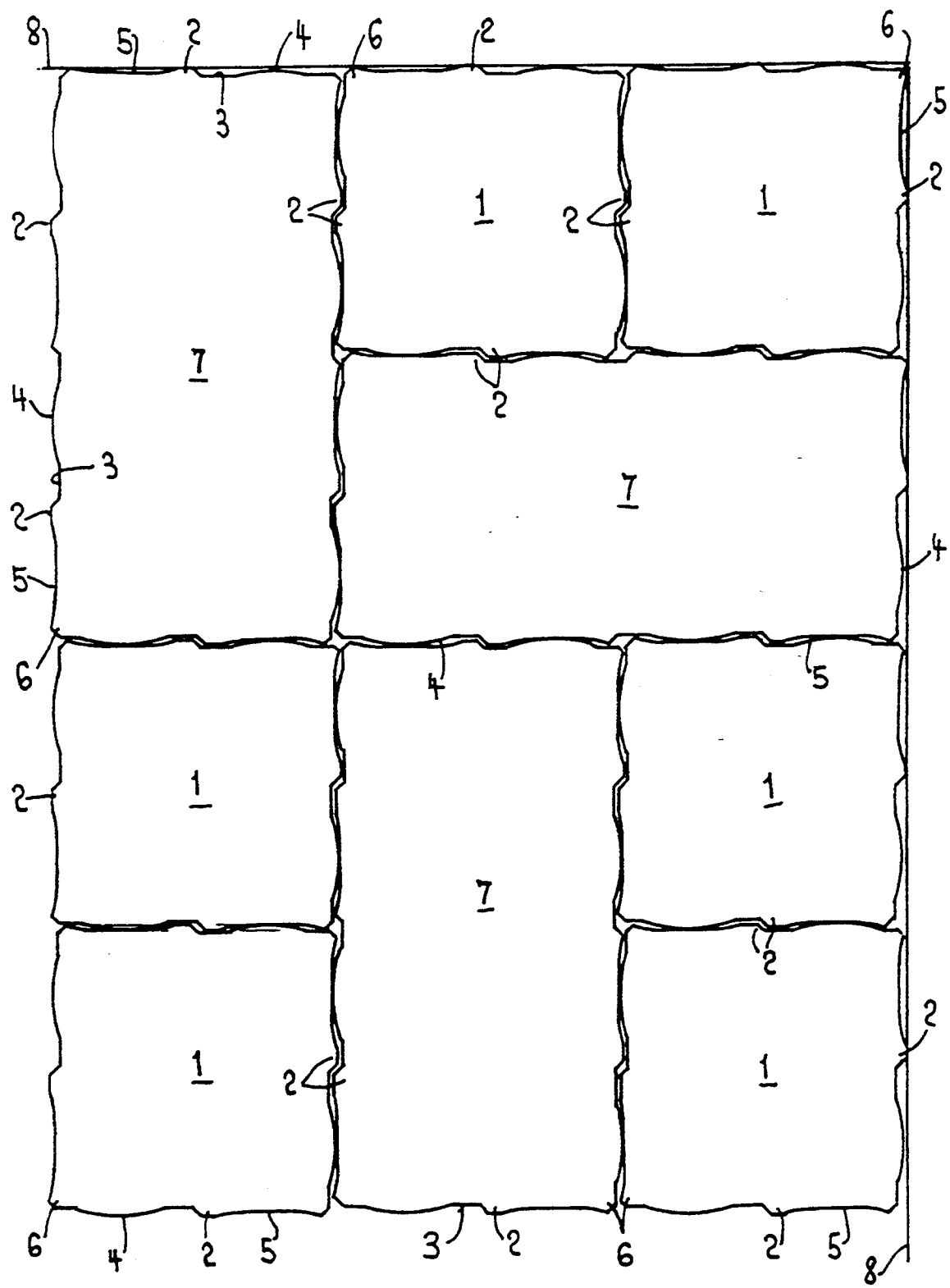

As shown in FIG. 2, in addition to square stones 1 according to FIG. 1, rectangular stones 7 may be provided. On their short sides, said rectangular stones are formed as the square stones, and on the long sides, the same group of elements is repeated twice in succession. FIG. 2 illustrates how adjoining stones interlock with little play, only the respective convex surface portions 4 and the flat central portions 5 being in contact along a line, thus positively determining the mutual distance of the stones, while the locking teeth 2 engage in spaces 3 with some play. Even the position of the edge stones, which abut on a bordering indicated by line 8 in FIG. 2, is positively determined by the contact of two apexes of the side surfaces, i.e. locking tooth 2 and corner tooth 6 adjacent concave surface portion 5. In spite of the reduced play between locking teeth 2 and tooth spaces 3, the stones are sufficiently secured against any mutual displacement or twisting. Due to the existing play and the line contact between neighboring stones, however, a certain mobility is maintained; in particular, individual stones may be slightly tilted with respect to the neighboring stones, as indicated in FIG. 3. The mentioned play between neighboring laid-out stones may be about 1 mm, for example, while the level difference between the highest and the lowest portions of the side surfaces may be e.g. about 4 mm. The mentioned mobility of the stones allows the pavements to be laid out over uneven places, e.g. at the junction of a horizontal courtyard and an inclined garage driveway.

In addition to the illustrated stones, stones of other shapes and sizes may be provided. For example, square stones with double or triple side lengths, angle stones or S-shaped stones, as long as the side surfaces each have at least one group of elements 2 to 5.

I claim:
1. A compound pavement stone, comprising:
   a generally planar top surface;
   a plurality of side surfaces extending substantially at a right angle to said planar top surface and having a predetermined complementary pattern cut into said side surfaces;
   wherein said predetermined complementary pattern allows said compound pavement stone to interlock with another compound pavement stone also having said predetermined complementary pattern and provides a clearance between said compound pavement stone and said another compound pavement stone to thereby allow a mutual tilting of said compound pavement stone relative to said another compound pavement stone;
   wherein said predetermined complementary pattern is formed at least once on each of said plurality of side surfaces, said predetermined pattern comprising in sequence a convex portion, a recessed portion, a tooth, and a concave portion.

2. The compound pavement stone of claim 1, wherein said complementary pattern has a interlock with a little clearance between complementary elements in said another compound pavement stone, with at least one of said elements in said compound pavement stone being in line contact with its complementary element in said another compound pavement stone.

3. The compound pavement stone of claim 1, wherein said predetermined complementary pattern on each of said side surfaces comprises at least said tooth and said recessed portion, said recessed portion for receiving a tooth from said another compound pavement stone.

4. The compound pavement stone of claim 3, wherein said recessed portion is wider than said tooth.

5. The compound pavement stone of claim 3, wherein said tooth has an end surface and said recessed portion has a bottom and wherein said end surface and said bottom are at least approximately flat.

6. The compound pavement stone of claim 1, wherein said convex portion has an arcuate profile while said concave portion has arcuate ends and a flat central portion.

7. The compound stone of claim 1, wherein a tooth is located on each corner of said compound stone with said convex portion being located on one side adjacent to said corner and said concave portion being located on another side adjacent to said corner.

8. The compound stone of claim 3, wherein one side of said tooth is steeper than the other side of said tooth.

9. The compound stone of claim 8, wherein the steeper side of said tooth is adjacent to said recessed portion.

10. A compound pavement stone, comprising:
a generally planar top surface;
a plurality of side surfaces extending substantially at a right angle to said planar top surface and having a predetermined complementary pattern cut into said side surfaces, said predetermined complementary pattern comprising a convex portion, a recessed portion, a concave portion, and a tooth;
wherein said predetermined complementary pattern allows said compound pavement stone to interlock with another compound pavement stone also having said predetermined complementary pattern and provides a clearance between said compound pavement stone and said another compound pavement stone to thereby allow a mutual tilting of said compound pavement stone relative to said another compound pavement stone; and
wherein said concave portion has a generally flat middle section extending between two arcuate end sections.

11. The compound pavement stone of claim 10, wherein said convex portion, said recessed portion, said concave portion, and said tooth are respectively complementary to a concave portion, a tooth, a convex portion, and a recessed space on said another compound pavement stone.

12. The compound pavement stone of claim 10, wherein said compound pavement stone contacts said another compound pavement stone at concave and convex portions of said predetermined pattern.

13. A compound pavement stone, comprising:
a generally planar top surface;
a plurality of side surfaces extending substantially at a right angle to said planar top surface and having a predetermined complementary pattern cut into said side surfaces, said predetermined complementary pattern comprising a convex portion, a recessed portion, a concave portion, and a tooth;
wherein said predetermined complementary pattern allows said compound pavement stone to interlock with another compound pavement stone also having said predetermined complementary pattern and provides a clearance between said compound pavement stone and said another compound pavement stone to thereby allow a mutual tilting of said compound pavement stone relative to said another compound pavement stone;
wherein said compound pavement stone is substantially formed in a shape of a parallelogram with said tooth portion being formed at each corner of said parallelogram.

* * * * *